(12) United States Patent
Lawler

(10) Patent No.: US 6,247,235 B1
(45) Date of Patent: Jun. 19, 2001

(54) SHEATHING SLITTER AND CUTTER TOOL

(76) Inventor: Patrick F. Lawler, 600 W. River St., Milford, CT (US) 06460

( * ) Notice: Subject to any disclaimer, the term of this patent is extended or adjusted under 35 U.S.C. 154(b) by 0 days.

(21) Appl. No.: 09/639,129

(22) Filed: Aug. 15, 2000

Related U.S. Application Data

(60) Provisional application No. 60/153,514, filed on Sep. 13, 1999.

(51) Int. Cl.[7] ..................................................... B21F 13/00
(52) U.S. Cl. ............................................. 30/90.4; 30/90.1
(58) Field of Search ..................................... 30/90.4, 90.6, 30/294, 353, 293, 90.1, 337, 339, 338

(56) References Cited

U.S. PATENT DOCUMENTS

| | | | |
|---|---|---|---|
| 778,388 | * 12/1904 | Warren | 30/338 |
| 1,748,638 | * 2/1930 | Crum | 30/90.4 X |
| 2,631,372 | * 3/1953 | Fournier | 30/353 X |
| 5,539,983 | * 7/1996 | Reyburn et al. | 30/294 X |

FOREIGN PATENT DOCUMENTS

| | | | |
|---|---|---|---|
| 31543 | * 5/1954 | (DE) | 30/90.4 |

OTHER PUBLICATIONS

Two sheets of photographs illustrating prior art cable stripper.

* cited by examiner

*Primary Examiner*—Douglas D. Watts
(74) *Attorney, Agent, or Firm*—Weingarten, Schurgin, Gagnebin & Hayes LLP

(57) ABSTRACT

A combined sheathing stripper and sheathing cutter tool for non-metallic sheathed cable. The tool includes a body that is used to retain a slitter-blade and a cutter-blade. The slitter-blade includes a first knife edge that is located on a first side of the tool body when the blade is mounted in the body and a second knife edge that is located on the other side of the tool body. The knife edges are oriented such that the first knife edge may be used for slitting a cable sheathing by pushing the tool while the first knife edge is engaging the sheathing and the second knife edge may be used for slitting a cable sheathing by pulling the tool while the second knife edge is engaging the sheathing. An opening is provided within the body and the cutter-blade includes a knife edge that faces the opening when the cutter-blade is mounted in the body. A cable sheathing that has been slit may be passed through the opening and cut off using the cutter-blade.

24 Claims, 9 Drawing Sheets

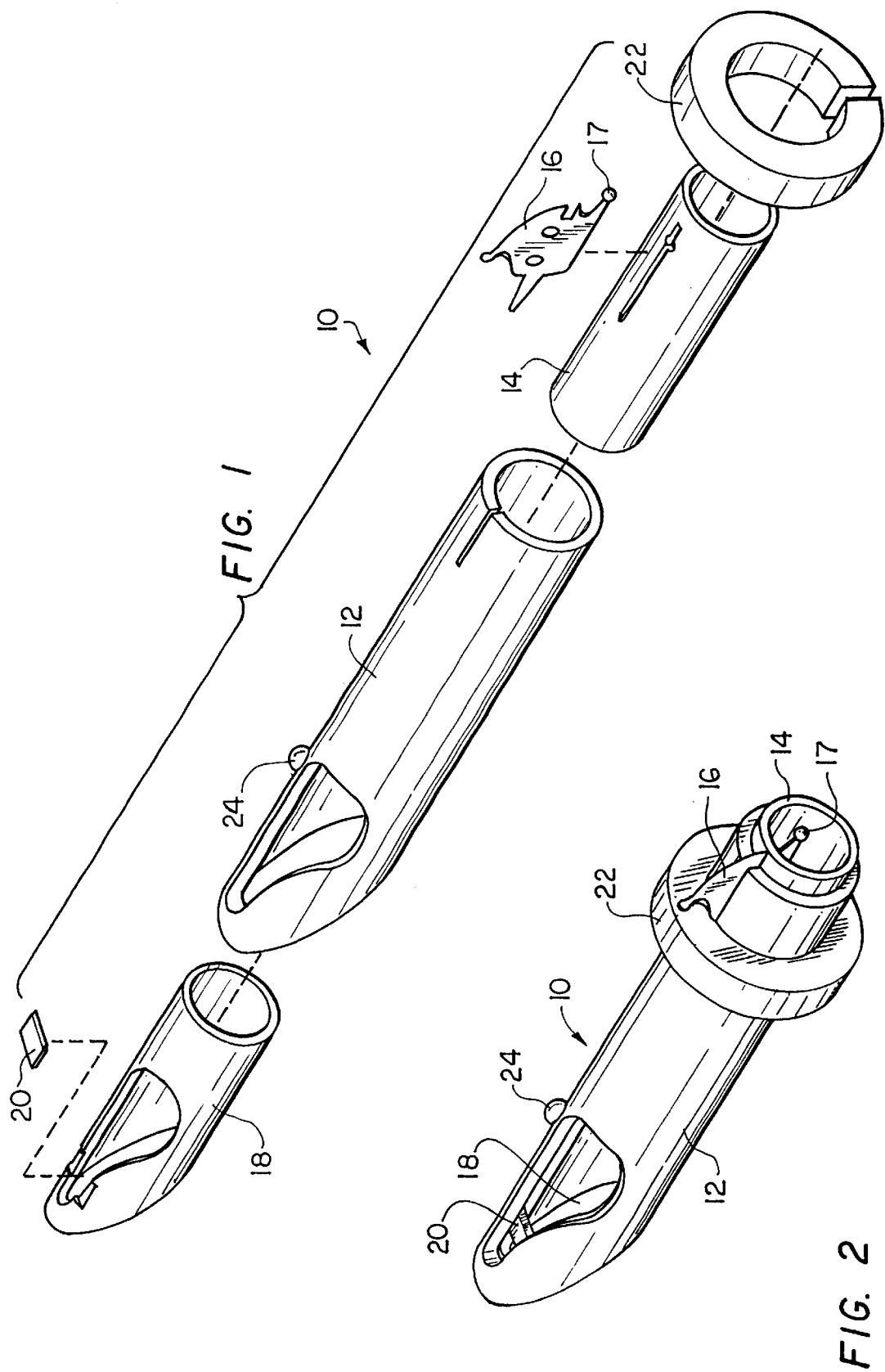

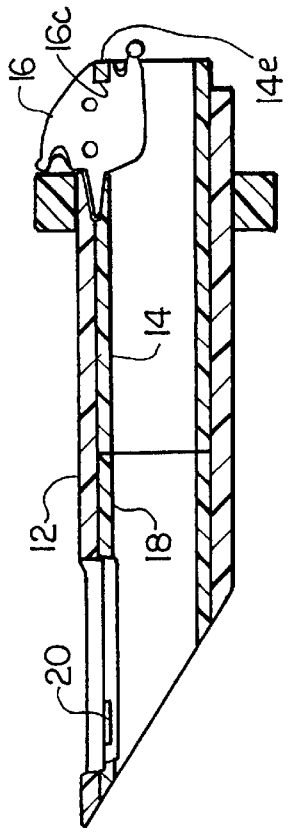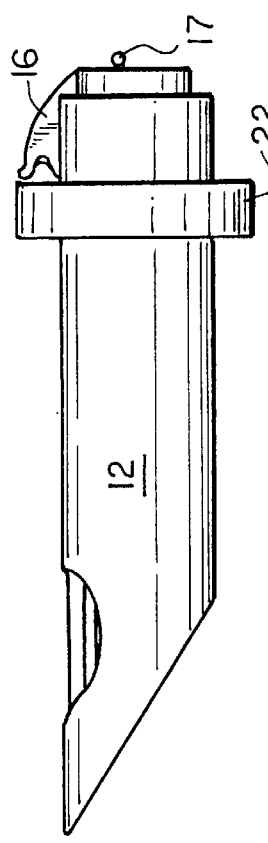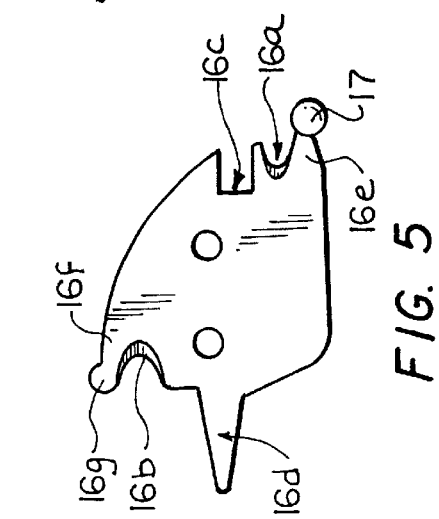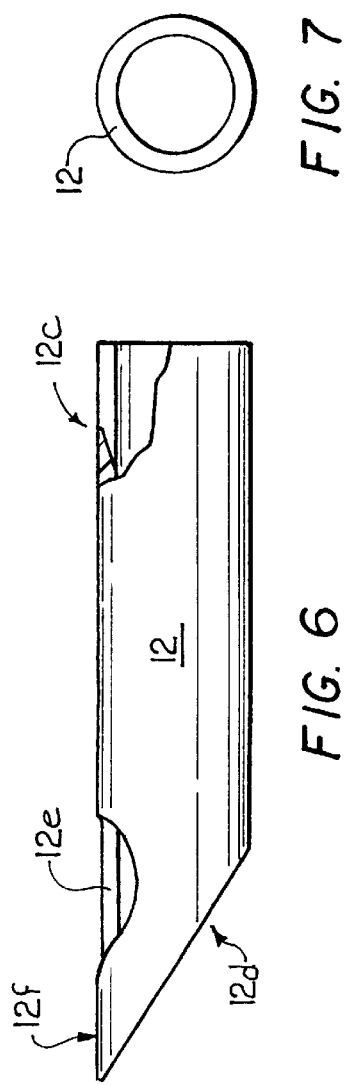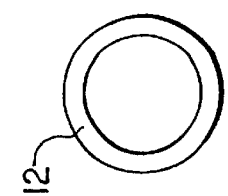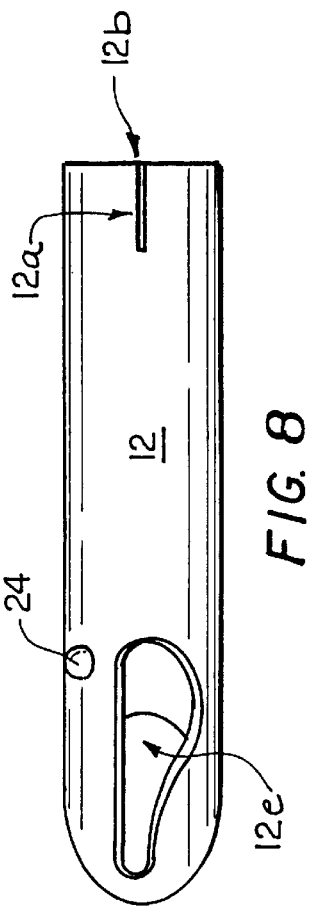

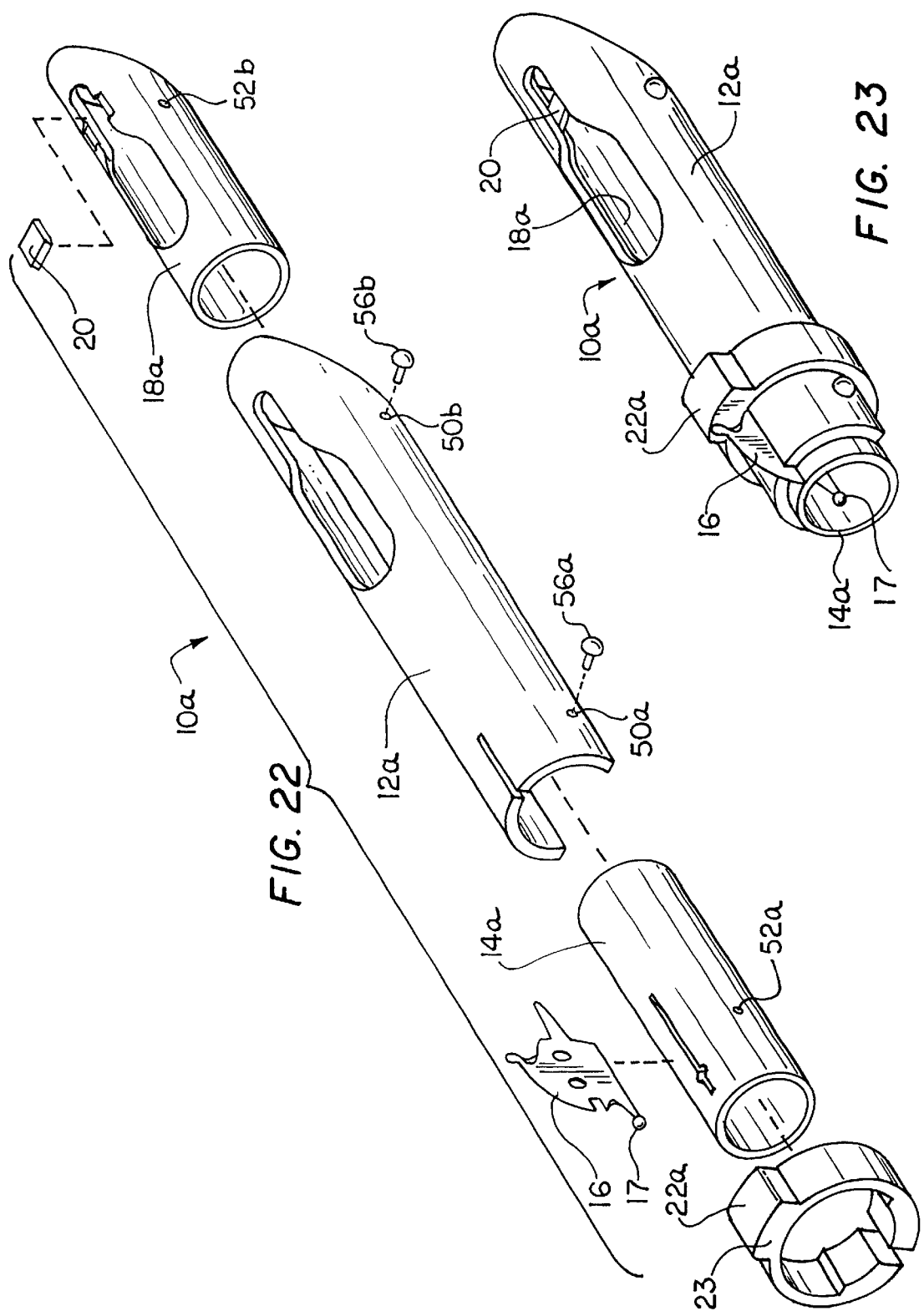

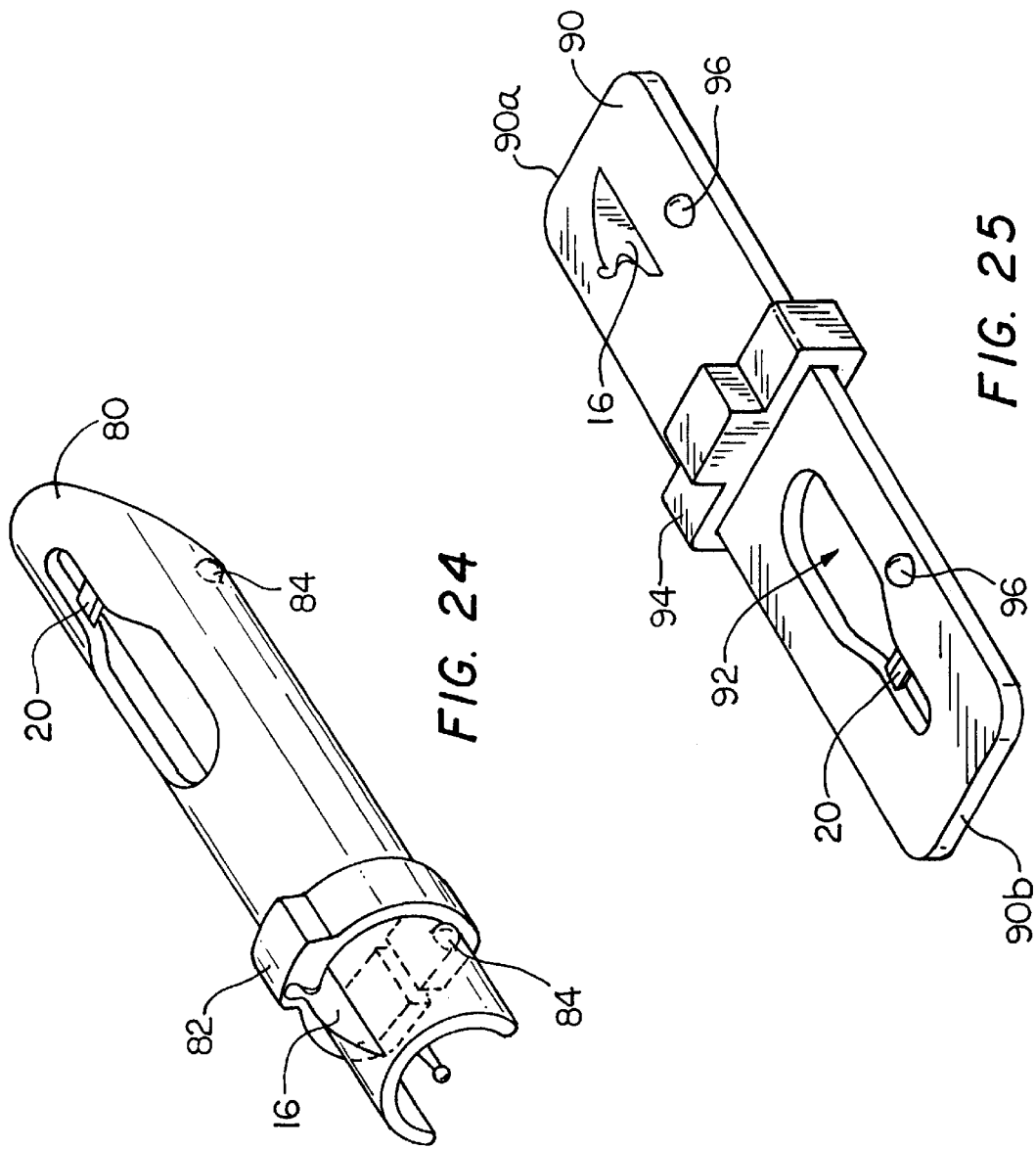

SHEATHING SLITTER AND CUTTER TOOL

CROSS REFERENCE TO RELATED APPLICATIONS

This application claims priority of U.S. Provisional application Ser. No. 60/153,514, filed Sep. 13, 1999.

BACKGROUND OF THE INVENTION

The present invention relates to a tool for use in the electrical trades and more specifically to a sheathing slitter and sheathing cutter tool for use in preparing non-metallic sheathed cables for wiring operations.

Non-metallic sheathed cables are widely used in the wiring of homes, commercial buildings and in other applications. Typically, such cables include metallic conductors or wires that have an insulating cover. The insulating cover prevents the wires from short-circuiting within the cable to each other or to a ground wire which may or may not be insulated. A number of insulated wires and a ground wire are typically surrounded by a non-metallic sheathing to create the non-metallic sheathed cable. As used herein, the term non-metallic sheathed cable is used to refer to any electrical cable that has insulated conductors contained within a sheath that is not made of metal. The sheath may be made of plastic, rubber, or any other non-metallic material.

In the wiring of homes and offices, non-metallic sheathed cables are typically strung between electrical boxes, between boxes and an appliance, or between other points or devices requiring electrical connection interconnection. After the stringing of the cables, the non-metallic sheathing is slit, and the slit portion of the sheathing is cut off. The slitting of the sheathing is often performed using a utility knife or a commercially available tool designed for the slitting of a particular cable size. The use of a utility knife can readily lead to injury if the knife slips during the cutting operation. One known commercially available tool is awkward to use and is not adapted to the slitting of non-metallic cables of disparate sizes. Additionally, this tool does not include a blade for cutting off the slit sheathing, so a separate tool is required to perform this operation. Finally, this tool includes a knife blade that may slice the insulating covering on the wires within the cable during the slitting of the sheathing and lead to short-circuiting of the wires within the cable.

It would therefore be desirable to have a sheathing slitting tool that could slit non-metallic cables with relative ease and additionally, could be employed to slit non-metallic cables of disparate size. Additionally, it would be desirable for such a tool to include a sheathing cutter to avoid the need to employ a separate tool for the cutting of the slit sheathing after the slitting process.

BRIEF SUMMARY OF THE INVENTION

A sheathing slitter and cutter tool is disclosed. In a preferred embodiment, the sheathing slitter and sheathing cutter are fabricated as a single tool that is adapted for the slitting of non-metallic covering of sheathed cables of disparate size and for cutting the slit portion of the sheathing from the cable following the sheathing slitting operation.

In one embodiment, the tool includes a sheathing slitter-blade and a sheathing cutter-blade which are retained within a truncated cylindrical body. The cylindrical body includes an outer tube, a sheathing slitter-blade retention tube, and a sheathing cutter-blade retention tube. The sheathing slitter-blade retention tube and the sheathing cutter-blade retention tube are of a diameter selected to permit the respective tubes to be disposed within the outer tube. The respective blades are retained by the outer tube and the corresponding retention tube.

The sheathing slitter-blade includes first and second knife edges. When the sheathing slitter-blade is retained within the cylindrical body, the first knife edge is disposed within the slitter-blade retention tube so as to facilitate the slitting of non-metallic sheathed cable as the cable is passed through the cylindrical body of the tool and past the first knife edge. The second knife edge is disposed external to the cylindrical body in the assembled tool and is employed for slitting non-metallic sheathed cables that are of too large a diameter to pass through the retention tubes or that are not convenient to slit using the first knife edge.

The sheathing cutter-blade is retained between the outer tube and the sheathing cutter-blade retention tube in the assembled tool. Openings are provided in the outer tube and the sheathing cutter-blade retention tube to permit the sheathing to be passed through the respective openings so as to permit the slicing of the sheathing with the cutter-blade. The respective tubes may be permanently mounted within the outer tube or alternatively, removably mounted within the outer tube to allow for replacement of one or both of the blades.

In another embodiment, the blades are molded within a body that maintains the blades in their respective positions. The body may be configured such that the blades are permanently captured within the body or alternatively, so that the blades are replaceable.

Other aspects, features and advantages of the invention will be further apparent from the detailed description of the invention that follows.

BRIEF DESCRIPTION OF THE SEVERAL VIEWS OF THE DRAWING

The invention will be more fully understood by reference to the following detailed description of the invention in conjunction with the following drawings of which:

FIG. 1 is an exploded perspective view of a combined sheathing slitter and cutter tool in accordance with the present invention;

FIG. 2 is an assembled perspective view of the combined sheathing slitter and cutter tool of FIG. 1;

FIG. 3 is a first side view of the combined sheathing slitter and cutter tool of FIG. 1;

FIG. 4 is a side cross-sectional view of the combined sheathing slitter and sheathing cutter tool of FIG. 1;

FIG. 5 is a side view of the sheathing slitter-blade employed in the combined sheathing slitter and sheathing cutter tool of FIG. 1;

FIG. 6 is a side partially cut away view of the outer tube employed in the combined sheathing slitter and sheathing cutter tool of FIG. 1;

FIG. 7 is an end view of the outer tube of FIG. 6;

FIG. 8 is a top of view of the outer tube of FIG. 6;

FIG. 22 is an exploded perspective view of another embodiment of a combined sheathing slitter and sheathing cutter in accordance with the present invention;

FIG. 23 is a perspective view of the assembled combined sheathing slitter and cutter depicted in FIG. 22;

FIG. 24 is a perspective view of a combined sheathing slitter and cutter tool having a molded body with a generally C shaped cross-section and having a sheathing slitter-blade and a sheathing cutter-blade captured within the molded body; and FIG. 25 is a perspective view of a combined sheathing slitter and cutter tool having a generally rectangular molded body with a sheathing slitter-blade and a sheathing cutter-blade captured within the molded body.

DETAILED DESCRIPTION OF THE INVENTION

Figure 9:
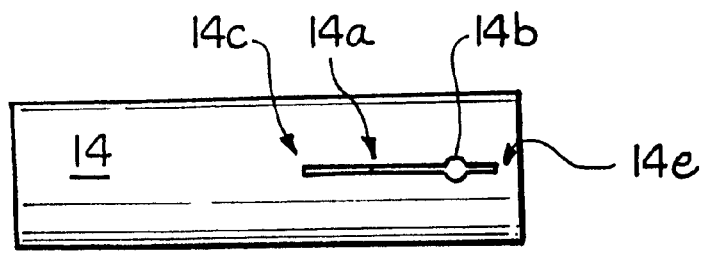
FIG. 9 is a top view of the sheathing slitter-blade retention tube employed in the combined sheathing slitter and sheathing cutter tool of FIG. 1.

In accordance with the present invention, a combined sheathing slitter and sheathing cutter tool is disclosed. The combined sheathing slitter and sheathing cutter tool permits both slitting and cutting of non-metallic sheathing typically found in sheathed cables to be performed, in a preferred embodiment, using a single tool. While depicted as, a combined tool in the preferred embodiment, it should be appreciated that the cable slitting and sheathing cutting operations may be performed using separate sheathing slitting and sheathing cutting tools of the type disclosed herein.

An exploded perspective view of one embodiment of a combined sheathing slitter and sheathing cutter tool 10 in accordance with the present invention is depicted in FIG. 1. The tool 10 includes an outer tube 12 which is sized to receive a sheathing slitter-blade retention tube 14 at a first end of the outer tube 12 and a sheathing cutter-blade retention tube 18 at a second end of the outer tube 12. The tool 10 includes a sheathing slitter-blade 16 and a sheathing cutter-blade 20 that are employed in the slitting and cutting of the sheathing of non-metallic sheathed cables. The blades are described in greater detail below. Additionally, the tool 10 includes a guard ring 22 that is also described with greater particularity below.

A perspective view of the assembled tool 10 is illustrated in FIG. 2. As shown, the sheathing slitter-blade 16 is retained between the outer tube 12 and the sheathing slitter-blade retention tube 14. The guard 22 may be slidably disposed along the outer tube 12 against the blade 16 so as to prevent inadvertent injury to a user from the exposed portion of the blade 16. The outer tube 12 includes a guard ring stop protrusion 24 which serves to limit lateral travel of the guard ring 22 along the outer tube 12 and prevents the guard ring 22 from sliding off the sheathing cutter-blade 20 end of the tool 10.

A side view of the assembled tool 10 is depicted in FIG. 3. As illustrated, the sheathing slitter-blade 16 includes a portion that extends above the outer tube 12. A user of the tool 10 is protected against inadvertent contact with the knife edge of the sheathing slitter-blade 16 that extends above the outer tube 12 by the guard ring 22 when the guard ring 22 is disposed adjacent the sheathing slitter-blade 16 as shown.

Referring to FIGS. 4–11, the manner in which the sheathing slitter-blade 16 is retained by the outer tube 12 and the sheathing slitter-blade retention tube 14 is shown. FIG. 4 illustrates the tool 10 assembly in cross-section and illustrates the slitter-blade 16 captured by the outer tube 12 and the slitter-blade retention tube 14. More particularly, referring to FIG. 5, the sheathing slitter-blade 16 includes a first knife edge 16a and a second knife edge 16b. The sheathing slitter-blade 16 also includes a ball 17 affixed to an inner blade protrusion 16e adjacent the first knife edge 16a. The ball 17 serves as a guide as the non-metallic sheathing is urged past the first knife edge 16a and promotes smooth slitting of the cable sheathing. The sheathing slitter-blade 16 further includes an outer blade protrusion 16f adjacent the second knife edge 16b. The outer blade protrusion 16f terminates in a generally circular end portion 16g. The sheathing slitter-blade 16 further includes a notch 16c and a generally triangular protrusion 16d that are used to secure the blade 16 in a blade mounting position within the tool 10.

Referring to FIGS. 6–8, the outer tube 12 includes a slot 12a. The outer tube 12 includes an overhanging portion 12c that is tapered and extends over a portion of the slot 12a as seen in FIG. 6. The protrusion 16d of the slitter-blade 16 is captured between the overhanging portion 12c and a cooperative sloped portion between points designated as 14c and 14d (FIG. 11) of the slitter blade retention tube 14.

Figure 10:
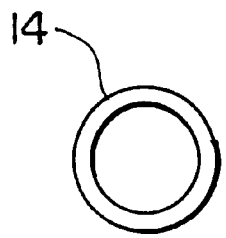
FIG. 10 is an end view of the sheathing slitter-blade retention tube of FIG. 9.
Figure 11:
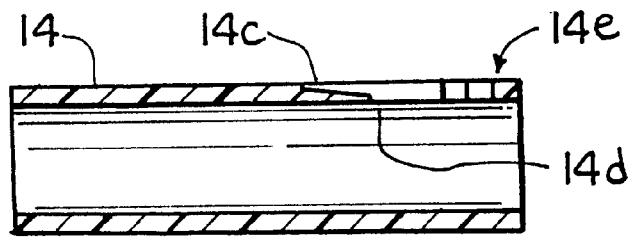
FIG. 11 is a side cross-sectional view of the sheathing slitter-blade retention tube of FIG. 9.

Referring to FIGS. 9–11, the sheathing slitter-blade retention tube 14 includes the slot 14a along the top of the tube and a generally circular opening 14b having an opening diameter which is greater than the width of the slot 14a. The slot 14a has a notch that is shallow at the end 14c and gets progressively deeper until the notch extends through the sheathing slitter-blade retention tube 14 as depicted at 14d. The slot 14a terminates at slot end 14e.

The manner in which the sheathing slitter-blade 16 is retained between the outer tube 12 and the sheathing slitter-blade retention tube 14 is shown with further particularity in the side cross-sectional view of FIG. 4. The sheathing slitter-blade 16 is mounted within the tool 10 by inserting the ball 17 through the circular opening 14b of the sheathing slitter-blade retention tube 14. The sheathing slitter-blade 16 is then positioned such that the slot 14a outside end 14e is captured within the notch 16c and the triangular protrusion 16d is seated into the sloped portion of the slot 14a between points designated 14c and 14d. The sheathing slitter-blade retention tube 14 and the sheathing slitter-blade 16 are then disposed in the sheathing slitter-blade end 12b of the outer tube 12 such that the outer blade protrusion 16f enters and is captured by the overhaning portion 12c of the outer tube 12.

Referring to FIGS. 4, 6–8, and 12–16, the manner in which the cutter-blade 20 is retained by the outer tube 12 and the sheathing cutter-blade retention tube 18 is illustrated. More particularly, the sheathing cutter-blade 20 includes a knife-edge 20a (FIG. 12) and first and second ends 20b. Referring to FIGS. 6–8, the outer tube 12 further includes an angled end 12d having an opening 12e and an overhanging portion 12f. The sheathing cutter-blade is captured between the overhanging portion 12f of the outer tube 12 and the sheathing cutter-blade retention tube 18.

Referring to FIGS. 13–16, the sheathing cutter-blade retention tube 18 includes a truncated end 18a. The truncated end 18a includes an opening 18b on the top side of the tube 18. Recesses 18d are provided on either side of the opening 18b within the cutter-blade retention tube 18. The recesses are sized to receive the sheathing cutter-blade 20 ends 20b and the cutter-blade is retained between the cutter-blade retention tube 18 and the outer tube 12. The manner in which the sheathing cutter-blade 20 is retained between the outer tube 12 and the sheathing cutter-blade retention tube 18 is described with further particularity below.

Figure 12:
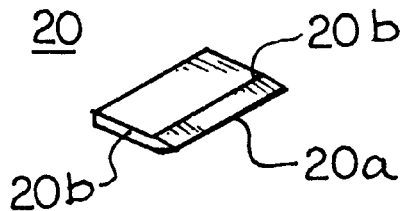
FIG. 12 is a perspective view of the sheathing cutter-blade employed in the combined sheathing slitter and sheathing cutter tool of FIG. 1.
Figure 13:
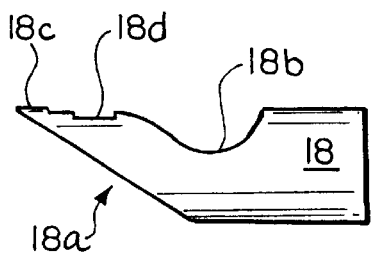
FIG. 13 is a side view of the sheathing cutter-blade retention tube employed in the combined sheathing slitter and sheathing cutter tool of FIG. 1.
Figure 14:
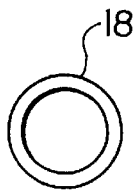
FIG. 14 is an end view of the sheathing cutter-blade retention tube of FIG. 13.
Figure 15:
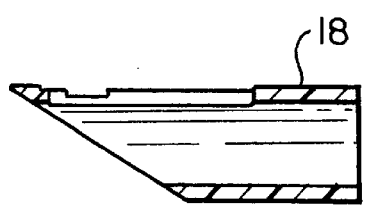
FIG. 15 is a side cross-sectional view of the sheathing cutter-blade retention tube of FIG. 13.
Figure 16:
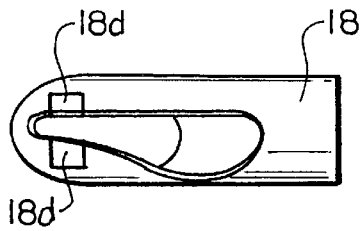
FIG. 16 is a top view of the sheathing cutter-blade retention tube of FIG. 13.

The sheathing cutter-blade ends 20b depicted in FIG. 12 are supported on the recessed portions 18d of the retention tube 18 with the sheathing cutter-blade 20 oriented such that the knife edge 20a faces the large part of the opening 18b. The sheathing cutter-blade retention tube 18 and sheathing cutter-blade 20 are then slidably disposed into the angled end 12d of the outer tube 12 such that the opening 12e of the outer tube 12 is aligned with the opening 18b of the sheathing cutter-blade retention tube 18. The sheathing cutter-blade retention tube 18 is secured within the outer tube 12 via glue or an adhesive or is removably secured within the outer tube to permit replacement of the cutter-blade. Once the cutter-blade retention tube 18 is disposed within the outer tube 12, the cutter-blade 20 is captured between the cutter-blade retention tube 18 and the outer tube 12.

The outer tube 12, sheathing slitter-blade retention tube 14, sheathing cutter-blade retention tube 18, and guard ring 22 are preferably fabricated of a plastic although any other suitable material may be employed. For example, the tubes and ring may be fabricated from PVC pipe and the tubes may be fastened together using PVC adhesive. Moreover, the tubes 12, 14, 18 and guard ring 22 may be fabricated of plastic using an injection molding process. The sheathing slitter-blade 16 and the sheathing cutter-blade 20 are fabricated of steel or any other suitable material.

Figure 17:
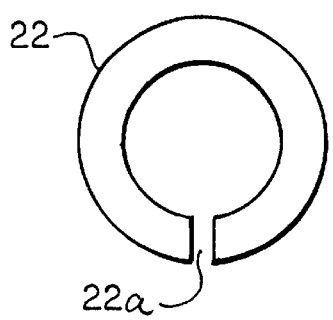
FIG. 17 is an end view of the guard ring employed in the combined sheathing slitter and sheathing cutter tool of FIG. 1.
Figure 18:
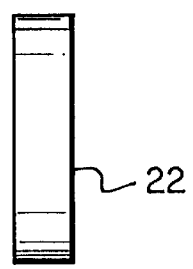
FIG. 18 is a side view of the guard ring of FIG. 17.

An end view of the guard ring 22 is illustrated in FIG. 17. The guard ring 22 includes an opening 22a to allow the ring 22 to be slidably disposed past the blade 16 and around the outer tube 12. The inner diameter of the ring 22 is sized to provide a frictional fit with the outer diameter of the outer tube 12 so that the ring 22 remains in place once positioned along the outer tube 12. Once disposed around the outer tube, the guard ring movement along the outer tube 12 is limited by the guard ring stop 24 (FIG. 1) and the slitter-blade protrusion 16f (FIG. 5). The guard ring stop 24 is generally spherical and may be fabricated of plastic or other suitable material. The stop 24 may be pressed into or glued into a recess in the outer tube 12 or formed integrally with the outer tube 12 if the outer tube 12 is formed using an injection molding process. Once the guard ring 22 has been slidably disposed beyond the blade 16, it may be rotated to prevent the guard ring 22 from sliding back past the blade 16 and off the sheathing slitter end of the outer tube 12. When the sheathing slitter-blade 16b is not in use, the guard ring 22 may be positioned in abutting relation with the slitter-blade 16 to reduce the possibility of injury from the knife edge 16b (FIG. 5). The outer diameter of the guard ring 22 is selected so that the guard ring 22 extends approximately to the height of the outer blade protrusion 16f.

Figure 19:
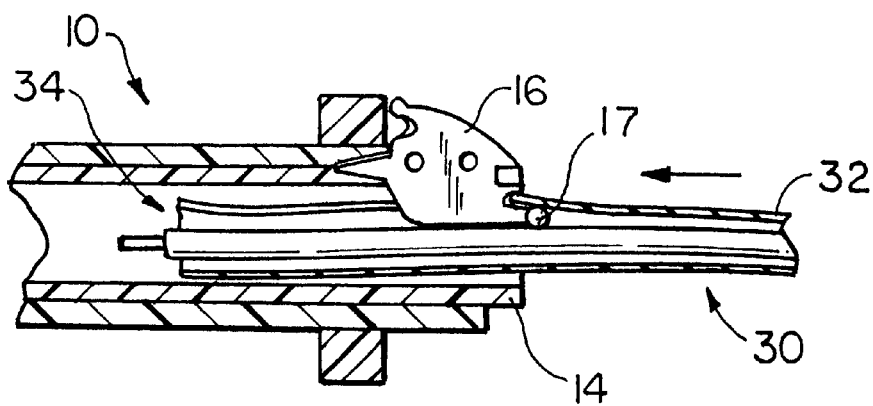
FIG. 19 is a side cross-sectional view illustrating the slitting of a non-metallic sheathed cable using the first knife edge of the sheathing slitter-blade of the combined sheathing slitter and sheathing cutter tool of FIG. 1.
Figure 20:
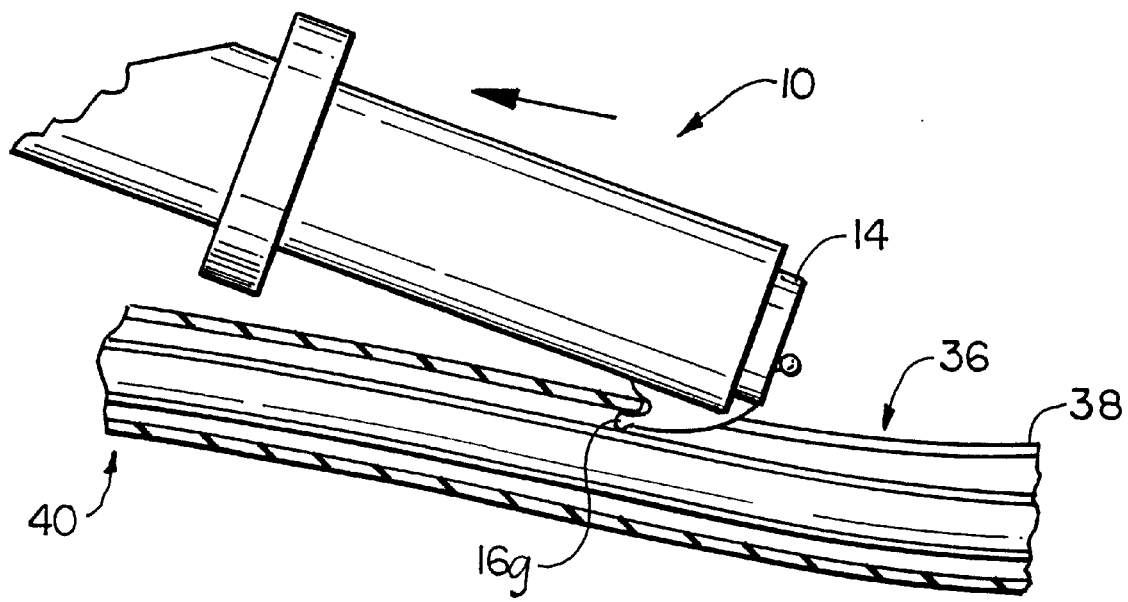
FIG. 20 is a side cross-sectional view illustrating the slitting of a large diameter cable using the second knife edge of the sheathing slitter-blade of the combined sheathing slitter and sheathing cutter tool of FIG. 1.

The use of the combined sheathing slitter and cutting tool 10 is illustrated in FIGS. 19 and 20. In the event the non-metallic sheathed cable may be passed through the tool 10, the inner knife-edge 16a of the slitter blade 16 may be employed in the slitting operation as shown in FIG. 19. The cable 30 is initially positioned such that the blade ball 17 is inserted under the cable sheathing 32 at a cable end 34. The tool is then urged against the cable such that the knife edge 16a of the sheathing slitter-blade 16 cuts through the cable sheathing 32. The ball 17 is comprised of plastic or other suitable material molded onto or adhered to the tip of the inner blade protrusion 16e. The ball 17 is sized to prevent the tool 10 from catching on paper insulation (not shown) typically found directly beneath the cable sheathing 32 of commercially available non-metallic sheathed cable. In a preferred embodiment, the ball diameter is approximately 0.060–0.70 inches, although this diameter may be varied so as to be larger or smaller than the preferred range. The sheathing along the full length of the cable 30 may be slit or the cable 30 may be withdrawn from the tool 10 after the desired length of cable sheathing has been slit.

The slitting of the sheathing of a non-metallic sheathed cable 36 having a diameter too large for insertion into the sheathing slitter-blade retention tube 14 of the tool 10 is illustrated in FIG. 20. It should be appreciated that the sheathing of smaller diameter cable may also be slit as illustrated in FIG. 20. The circular end 16g on the outer blade protrusion 16f is placed against the cable sheathing 38. Preferably, the circular end 16g is placed on the cable 36 at a distance from the cable end 40 that is approximately equal to the desired stripping length. Downward force is exerted on the tool 10 such that the circular end 16g penetrates the cable sheathing 38. The tool 10 is then pulled toward the cable end 40 in the direction indicated to slit the cable sheathing 36 using the knife-edge 16b of the slitter blade 16.

Figure 21:
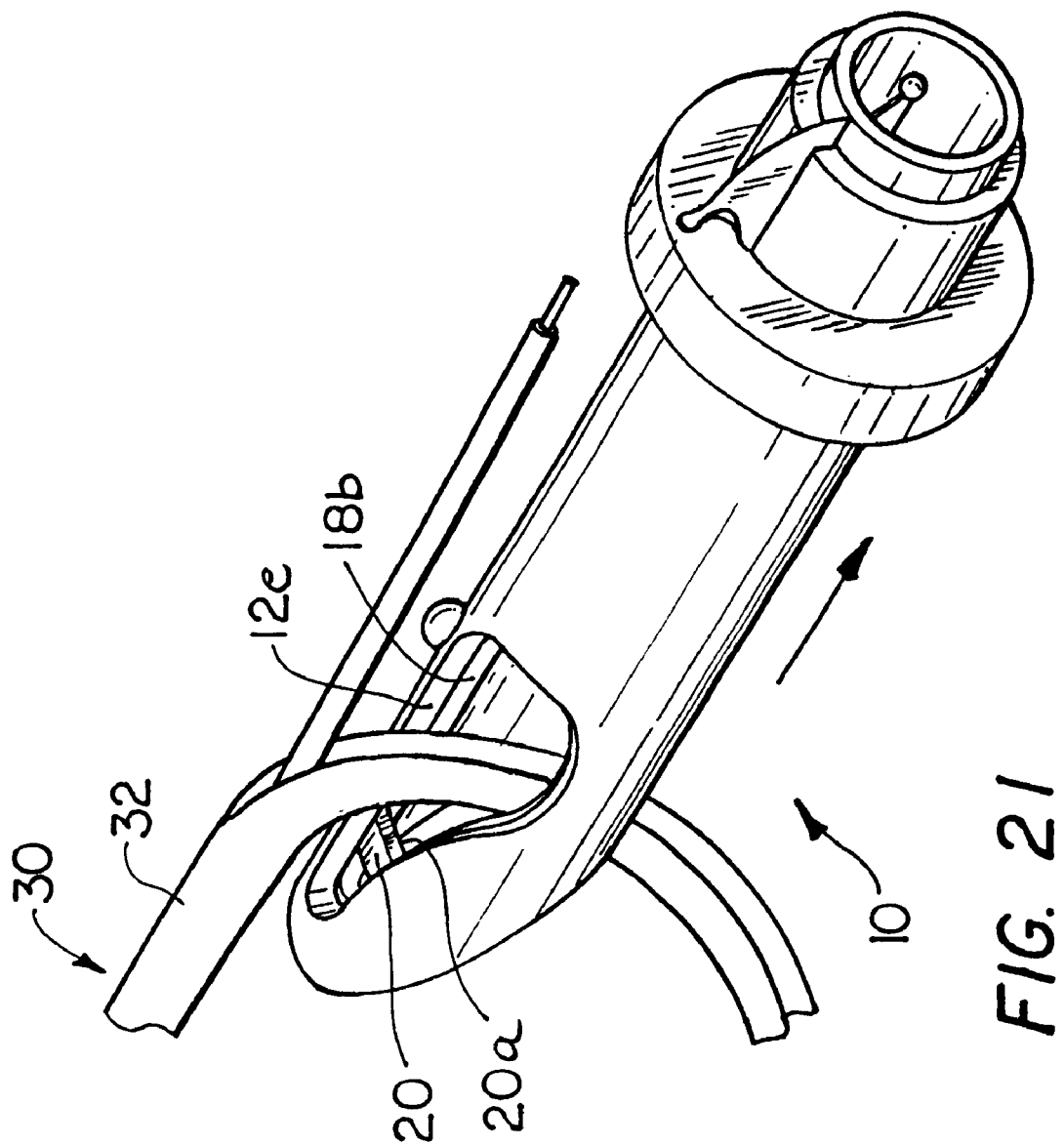
FIG. 21 is a perspective side cross-sectional view illustrating the severing of a slit portion of sheathing from a cable using the knife edge of the sheathing cutter-blade of the combined sheathing slitter and sheathing cutter tool of FIG. 1.

The severing of a slit portion of the sheathing from the cable 30 using the tool 10 is illustrated in FIG. 21. The slit sheathing 32 is passed through the respective openings 12e and 18b in the outer tube 12 and the cable sheathing cutter retention tube 18. The tool 10 is then pulled so as to urge the cutter blade 20a against the sheathing 32 and sever the slit portion of the sheathing from the cable 30.

Another embodiment of a combined sheathing slitter and cutting tool 10a in accordance with the present invention is depicted in FIGS. 22 and 23. The sheathing slitter and sheathing cutter tool 10a includes a body member 12a that has a generally C-shaped cross-section. Additionally, the tool 10a includes a sheathing slitter-blade retention tube 14a and a sheathing cutter-blade retention tube 18a. The body member 12a cross-section extends through slightly more than a semi-circular arc so as to retain the sheathing slitter-blade retention tube 14a and the sheathing cutter-blade retention tube 18a when the respective tubes are disposed or snapped into the body member 12a. A guard ring 22a has an interior opening which is configured so as to generally abut the body member 12a and the sheathing slitter-blade retention tube 14a when disposed over the body member 12a. The guard ring 22a includes an elevated portion 23 that, in a preferred embodiment, extends slightly above the height of the uppermost portion of the blade 16 so as to provide protection for both a user of the tool and the blade 16. The sheathing slitter-blade retention tube 14a and the sheathing cutter-blade retention tube 18a may be retained within the body portion 12a in a variety of ways. Holes 50a and 50b may be provided through the body member 12a and corresponding holes 52a, 52b may be provided in the slitter-blade retention tubes 14a and the cutter blade retention tube 18a respectively. A first pin 56a may be inserted through the hole 50a in the body member 12a and the hole 52a in the slitter-blade retention tube 14a to fixably position the slitter-blade retention tube 14a within the body member 12a. Similarly, a second pin 56b may be inserted through the hole 50b in the body member 12b and the hole 52b in the cutter-blade retention tube 18a to fixably position the cutter-blade retention tube 18a within the body member 12a. The pins 56a, 56b may be removed to permit disassembly of the tubes 14a and 18a from the body member 12a. By permitting disassembly of the respective tubes from the body member 12a, the slitter-blade 16 and/or the cutter-blade 20 may be replaced should they become worn or damaged.

Figure 23A:
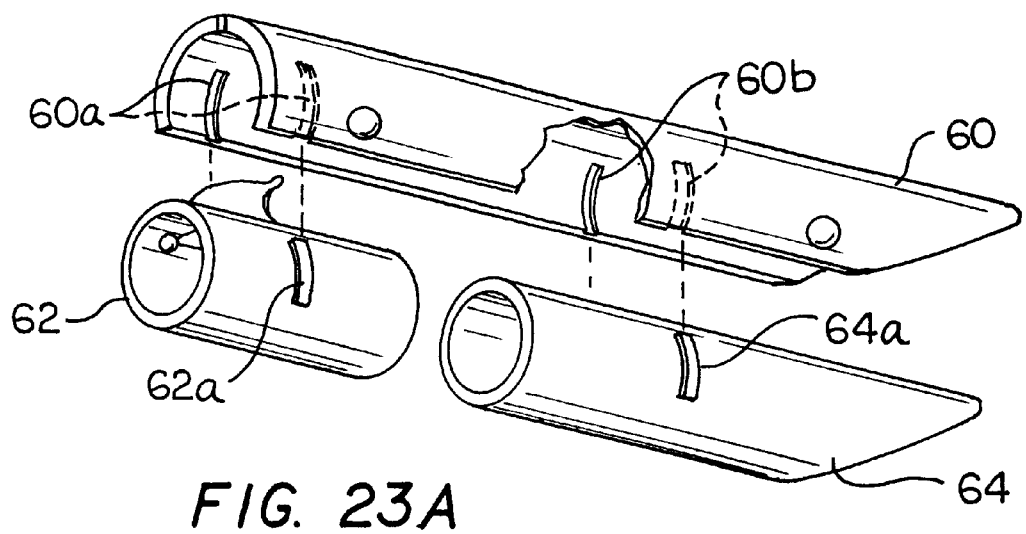
FIG. 23a is a cutaway view of a variation of the embodiment depicted in FIG. 22 illustrating modified retention tubes and a modified outer tube.

FIG. 23a depicts another technique for fixably positioning a slitter-blade retention tube 62 and a cutter blade retention tube 64 within a body member 60. More particularly, as illustrated in FIG. 23a, the tool in accordance with the present invention includes the body member 60, a slitter blade retention tube 62, the cutter-blade retention tube 64 as generally described above with respect to FIGS. 22 and 23. The slitter-blade retention tube 62 includes raised ridges 62a that are intended to engage corresponding recesses 60a on the interior surface of the body member 60. Upon engagement of the raised ridges 62a of the slitter-blade retention tube 62 within the recesses 60a in the body member 60, longitudinal movement of the slitter-blade retention tube 62 within the body member 60 is prevented. Similarly, raised ridges 64a (one not shown) may be provided on the cutter-blade retention tube 64 for engagement with corresponding recesses 60b in the body member 60 when the cutter-blade retention tube 64 is disposed within the body member 60 in assembled relation. It should be noted that in an alternative embodiment, raised ridges may be provided on the inner surface of the body member 60 and corresponding recesses may be provided in the surface of the respective slitter-blade and cutter-blade retention tubes 62 and 64.

Figure 23B:
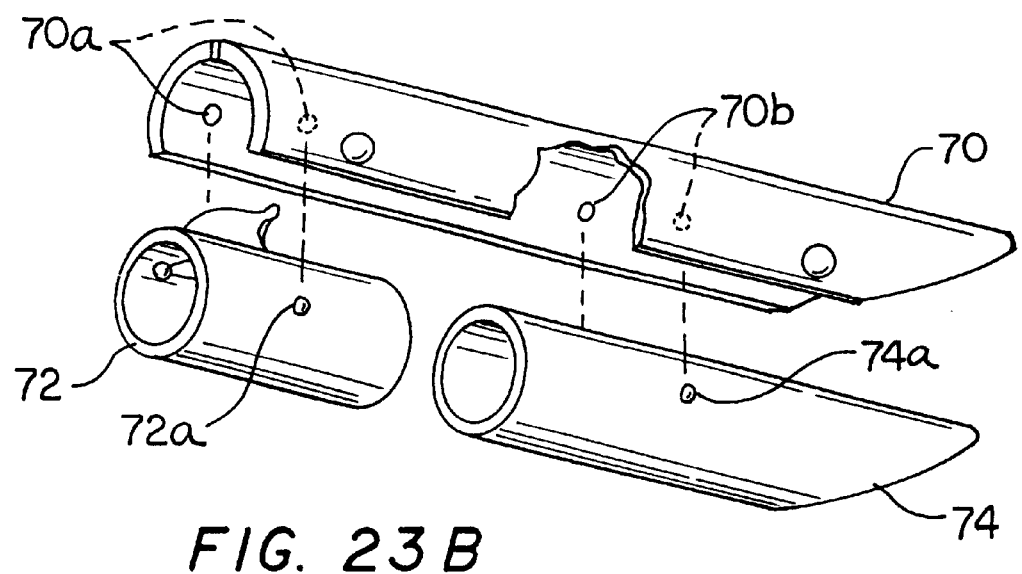
FIG. 23b is a cutaway view of another variation of the embodiment depicted in FIG. 22 illustrating modified retention tubes and a modified outer tube.

In an alternative embodiment depicted in FIG. 23b, the tool includes a body member 70, a slitter-blade retention tube 72 and a cutter-blade retention tube 74. Protrusions, such as bumps 72a, may be provided on the slitter-blade retention tube 72 and, bumps 74a may be provided on the cutter-blade retention tube 74. The bumps 72a and 74a are located on the slitter-blade and cutter-blade retention tubes 72 and 74 respectively so as to engage respective recesses 70a and 70b on the interior surface of the body member 70 when the slitter-blade and cutter-blade retention tubes 72 and 74 are disposed in assembled relation in the body member 70. The engagement of the bumps within the respective recesses prevents undesired longitudinal movement of the retention tubes 72 and 74 once the respective tubes have been mounted within the body member 70.

In yet another embodiment depicted in FIG. 24, the blades 16 and 20 are molded into a unitary plastic body member 80 having a generally C-shaped cross section. The blades are generally oriented as described with respect to FIG. 2 however, the blades are not replaceable. Alternatively, the C-shaped body may be fabricated such that the blades snap into place within the molded body to permit replacement of one or both of the blades 16, 20. A guard ring 82 may be disposed around the body member 80 to protect a user against inadvertent contact with the blade 16 when the tool is not in use. Protrusions 84 may be provided to limit the travel of the guard ring 82 along the body member 80.

In another embodiment depicted in FIG. 25, the tool has a generally rectangular unitary molded body member 90 having a first end 90a and a second end 90b. The blades 16 and 20 are retained within the molded body member 90. The slitter-blade 16 is located at one end of the body member 90 with the first knife edge 16a of the slitter-blade 16 disposed on one side of the body member 90 and the second knife edge 16b of the slitter-blade 16 located on the other side of the body member 90. The first knife edge 16a is generally facing the first end 90a of the body member 90 and the second knife-edge 16b is generally facing the second end 90b of the body member 90.

The body member 90 includes an opening 92 to permit a slit cable sheathing to be passed through the opening 92 and severed using the cutter-blade 20. A guard member 94 may be employed as described above and protrusions or stops 96 may be integrally molded into the body member 90 to limit the travel of the guard member 94.

Those of ordinary skill in the art will appreciate that modifications to and variation of the above-described sheathing slitter and cutter tool may be made without departing from the inventive concepts disclosed herein. Accordingly, the invention should not be viewed as limited except as by the scope and spirit of the appended claims.

What is claimed is:

1. A tool for preparing non-metallic sheathed cables, comprising:

a body having first and second ends, a first side and a second side, and an opening adjacent said second end of said body;

a slitter-blade having first and second knife edges, said blade mounted to said body adjacent said first end such that said first knife edge is adjacent said first side of said body and said second knife edge is positioned adjacent said second side of said body; and a cutter-blade having a cutter-blade knife edge, said cutter-blade being mounted within said body such that said cutter-blade knife-edge is facing said opening so as to permit the cutting of non-metallic sheathed cables inserted through said opening with said knife-edge of said cutter-blade.

2. The tool of claim 1 wherein said first and second knife edges are oriented such that said first knife edge is generally facing said first end of said body and said second knife edge is generally facing said second end of said body.

3. The tool of claim 1 wherein said first and second knife edges are generally curved.

4. A tool for preparing non-metallic sheathed cables comprising:

a tubular body having first and second ends, a first side and a second side; and a slitter-blade having first and second knife edges, said blade mounted to said body adjacent said first end such that said first knife edge is adjacent said first side of said body and said second knife edge is positioned adjacent said second side of said body, wherein said body comprises:

an outer tubular body member having a first end corresponding to said first end of said body and a second end corresponding to the second end of the body, said outer body member having a slitter-blade receiving slot adjacent said outer body member first end; and a slitter-blade retention tube having a first end generally corresponding to the first end of said body and a second end, said slitter-blade retention tube having a slitter-blade receiving slot adjacent said first end of said slitter-blade retention tube, said slitter-blade retention tube being disposed within said outer member in a slitter-blade retention tube mounting position, wherein said slitter-blade is disposed in said slitter-blade receiving slot in a slitter-blade mounting position, and wherein said slitter-blade is captured by said outer member and said slitter-blade retention tube when said slitter-blade retention tube is disposed within said outer member in said slitter-blade retention tube mounting position.

5. The tool of claim 4 wherein said outer tubular body member has a generally circular cross-section.

6. The tool of claim 4 wherein said outer tubular body member has a generally C-shaped cross-section.

7. The tool of claim 5 wherein said slitter-blade retention tube has a generally circular cross-section.

8. The tool of claim 4 wherein said outer body member has an opening adjacent said second end of said member, said tool further including:

a cutter-blade retention tube having a first end and a second end and disposed in a cutter-blade retention tube mounting position within said outer body member, said second end of said cutter-blade retention tube generally corresponding to the second end of said body when said cutter-blade retention tube is disposed within said cutter-blade retention tube mounting position, said cutter blade retention tube having an opening adjacent said cutter-blade retention tube second end that is generally aligned with said outer body member opening when said cutter-blade retention tube is disposed in said cutter-blade retention tube mounting position; and a cutter blade having a cutter-blade knife edge, said cutter blade being retained between said outer body member and said cutter blade retention tube such that said cutter-blade knife-edge is facing said aligned openings of said outer body member and said cutter-blade retention tube so as to permit the cutting of non-metallic sheathed cables inserted through said aligned openings with said knife-edge of said cutter-blade.

9. The tool of claim 1 wherein said body has a generally C-shaped cross section.

10. The tool of claim 9 wherein said body comprises a unitary plastic structure.

11. The tool of claim 1 wherein said body comprises a tubular body having a generally rectangular cross-section.

12. The tool of claim 11 wherein said body comprises a unitary plastic structure.

13. A blade for use in a tool for slitting non-metallic sheathed cables, said blade comprising:

a generally planar body having first and second sides, said generally planar body having a centerline generally defining an upper body portion having an upper edge and a lower body portion having a lower edge;

a first knife edge formed in said lower body portion and generally facing a first direction, said first knife edge being adjacent a first protrusion along said lower body portion edge;

a second knife edge formed in said upper body portion and generally facing a second direction opposing said first direction, said second knife edge being adjacent a second protrusion along said upper body portion edge; and a notch along said first side along said centerline and a third protrusion extending from said second side of said body generally along said centerline.

14. The blade of claim 13 further including a generally spherical member affixed to said first protrusion.

15. The blade of claim 13 wherein said third protrusion comprises a generally V-shaped member.

16. The tool of claim 1 wherein said body is generally tubular and defines a body interior area and a body exterior area, said tubular body having a generally circular cross-section along at least a portion of said body, wherein said first side of said body corresponds to said exterior area and said second side of said body corresponds to said interior area.

17. A tool for preparing non-metallic sheathed cables comprising:

a tubular body;

a slitter blade;

said tubular body defining an unobstructed passage therethrough except for said slitter blade and a body exterior area surrounding said tubular body, said body having first and second ends; and said slitter-blade having first and second knife edges, said slitter-blade being mounted to said tubular body such that said first knife edge is disposed in said body exterior area and facing said first end of said body and said second knife edge is disposed within said passage and facing said second end of said body.

18. The tool of claim 17 wherein said tubular body has a generally circular cross-section.

19. The tool of claim 17 wherein said tubular body has a generally C-shaped cross-section.

20. The tool of claim 17 wherein said tubular body has a generally rectangular cross-section.

21. The tool of claim 17 wherein said tubular body includes an outer tubular body member and an inner tubular body member disposed within said outer tubular body member and said slitter-blade is captively retained by said outer and inner tubular body members.

22. A tool for preparing non-metallic sheathed cables comprising:

a tubular body, said tubular body defining a passage therethrough and a body exterior area surrounding said tubular body, said body having first and second ends; and a slitter-blade having first and second knife edges, said slitter-blade being mounted to said tubular body adjacent said first end of said body such that said first knife edge is disposed in said body exterior area and said second knife edge is disposed within said passage, wherein said tubular body includes an opening adjacent said second end of said tubular body and said tool further includes a cutter-blade having a cutter-blade knife edge, said cutter-blade being mounted in said body such that said cutter-blade knife edge is facing said opening so as to permit the cutting of non-metallic sheathed cables inserted through said opening with said cutter-blade knife edge.

23. The tool of claim 22 wherein said tubular body includes an outer tubular body member and a cutter-blade retention tube and said cutter-blade is captively retained by said outer tubular body member and said cutter-blade retention tube.

24. The tool of claim 22 wherein said tubular body is truncated at said second end of said tubular body on the tubular body portion opposing said opening.

* * * * *